United States Patent [19]

Bevins

[11] Patent Number: 4,759,437
[45] Date of Patent: Jul. 26, 1988

[54] HANDRAIL FOR AIRCRAFT BELT LOADER
[75] Inventor: John R. Bevins, Orlando, Fla.
[73] Assignee: FMC Corporation, Chicago, Ill.
[21] Appl. No.: 856,620
[22] Filed: Apr. 25, 1986
[51] Int. Cl.$^4$ .............................................. B65G 41/00
[52] U.S. Cl. ..................................... 198/632; 198/836;
5/430; 182/113; 403/93
[58] Field of Search ................... 5/425, 428, 429, 430;
182/113, 152; 198/300, 337, 318, 632, 836;
403/92, 93

[56]  References Cited
U.S. PATENT DOCUMENTS

| | | | |
|---|---|---|---|
| 2,425,860 | 8/1947 | Brady | 198/318 X |
| 3,248,744 | 5/1966 | Hutt | 5/429 |
| 4,371,056 | 2/1983 | Anglade | 182/113 X |
| 4,475,625 | 10/1984 | Clements | 182/113 |
| 4,574,937 | 3/1986 | Anderson et al. | 198/836 X |

FOREIGN PATENT DOCUMENTS

| | | | |
|---|---|---|---|
| 531461 | 1/1922 | France | 403/93 |
| 956194 | 4/1964 | United Kingdom | 5/430 |

Primary Examiner—Joseph E. Valenza
Assistant Examiner—Jonathan D. Holmes
Attorney, Agent, or Firm—Ronald C. Kamp; Richard B. Megley

[57] ABSTRACT

A handrail for an aircraft belt loader in which a pair of parallel support arms pivotally support a rigid rail member with a variable-length link converted to be non-parallel with the support arms when the handrail is erect or operative. When the handrail is collapsed, the link is shortened and a compression spring inside of the link is further compressed so that maximum erecting force is applied when the handrail is stowed.

6 Claims, 3 Drawing Sheets

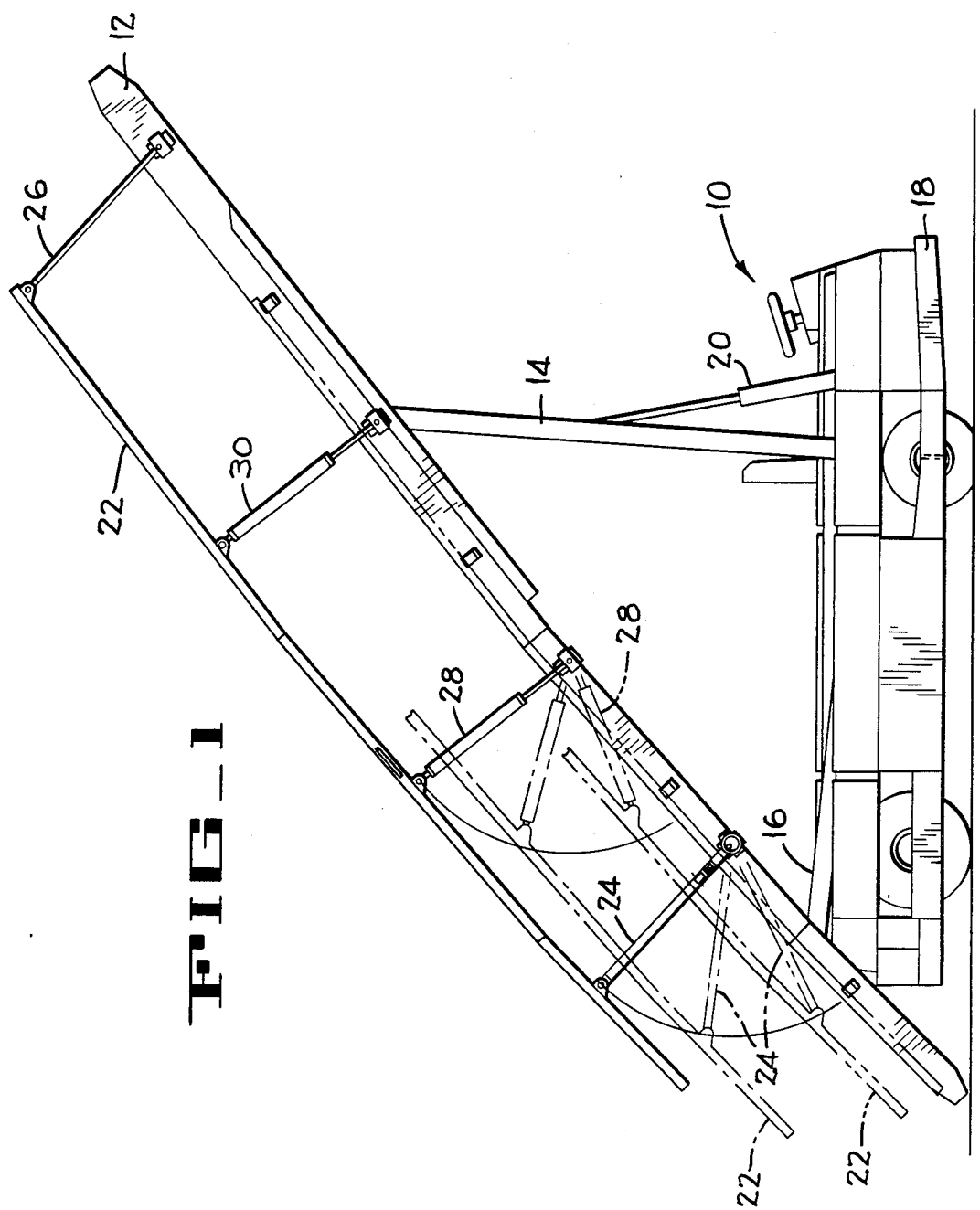

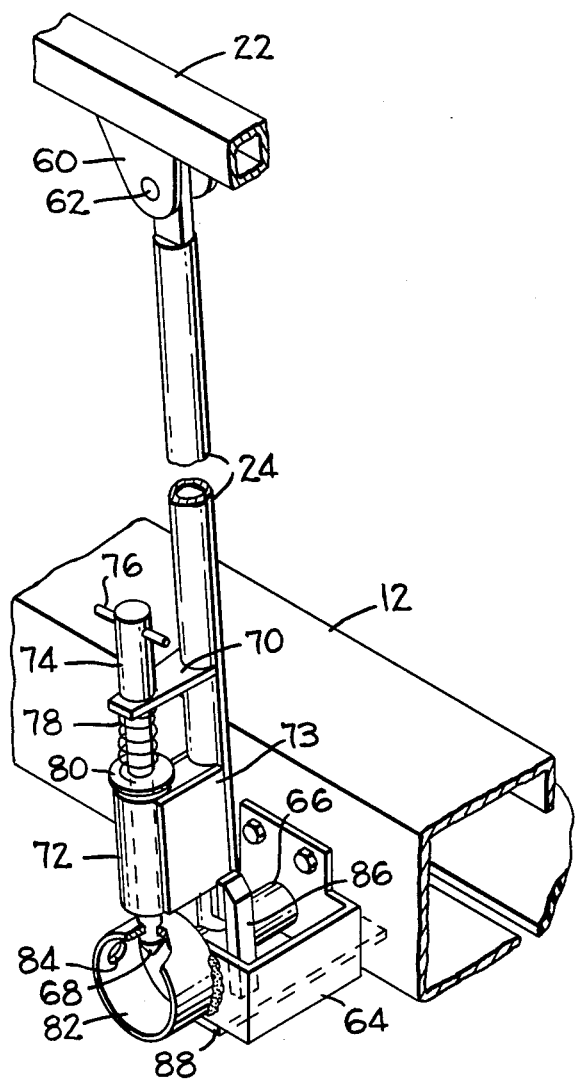
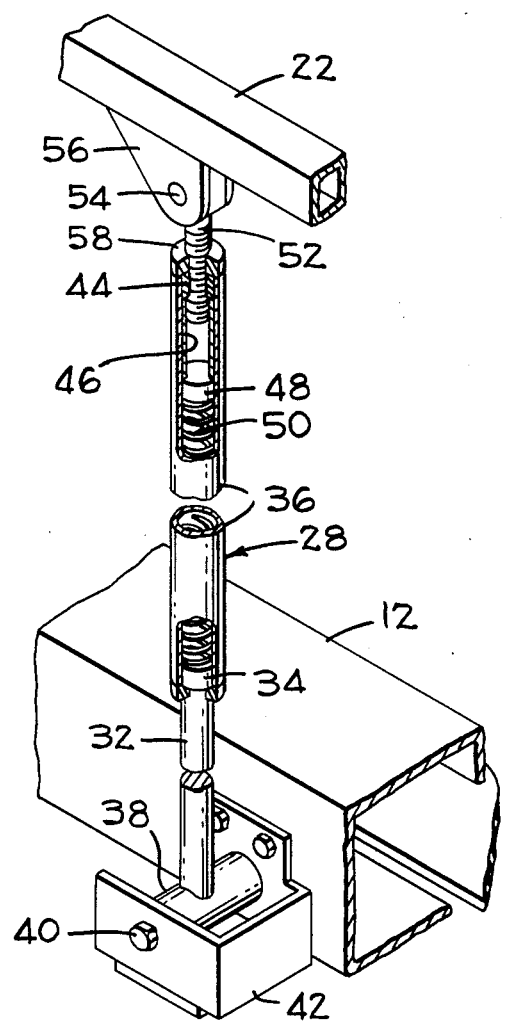
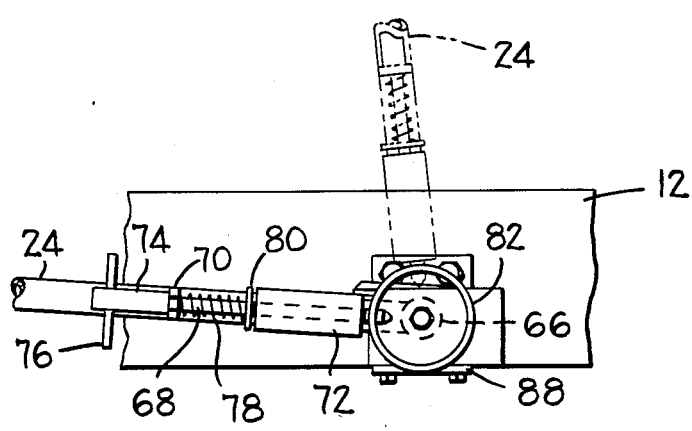
FIG_2
FIG_4
FIG_3

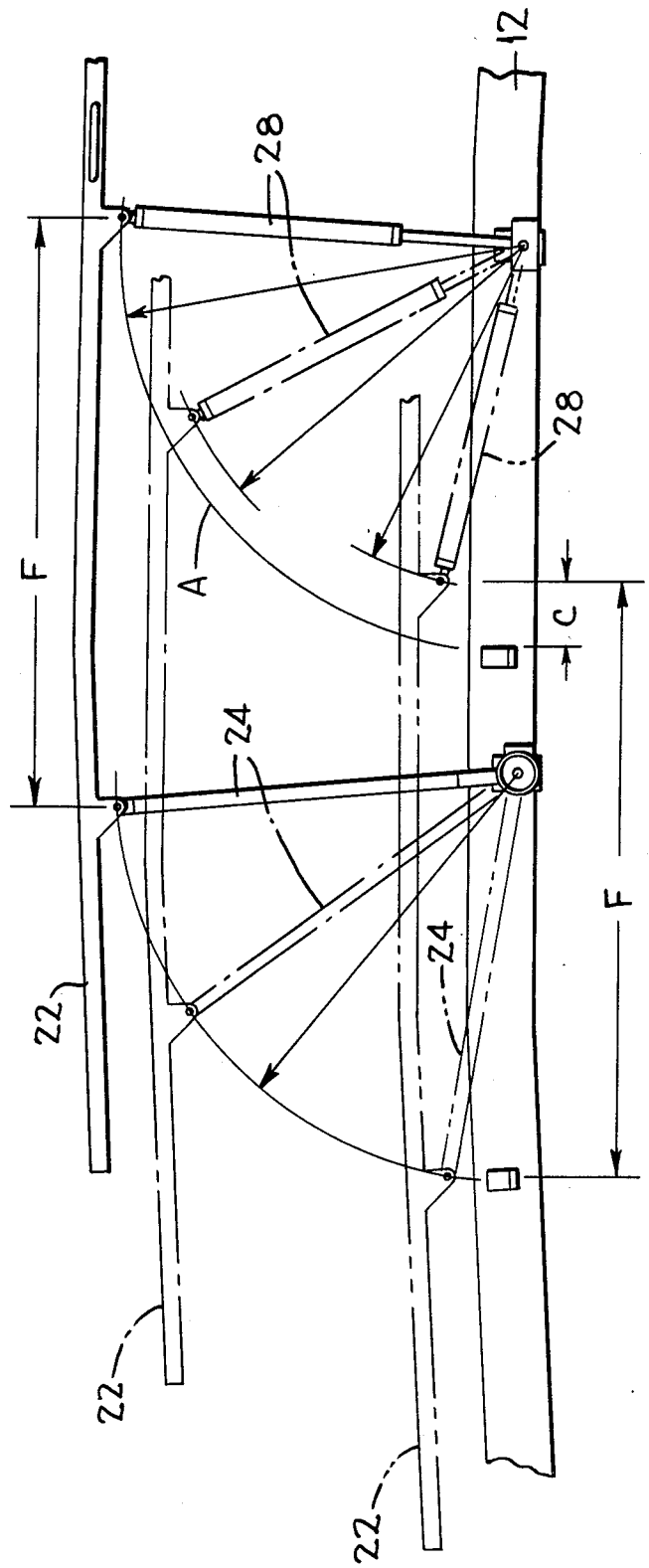
FIG_5

HANDRAIL FOR AIRCRAFT BELT LOADER

This invention relates to handrails for aircraft belt loaders generally, and more particularly to such handrails which are collapsible.

Aircraft belt loaders are used to transfer luggage and other parcels between the aircraft and the ground, and also serve as a walkway for ground personnel in their ingress to and egress from the cargo bays of large aircraft. Hand rails are essential for safe passage of the personnel and, if collapsible, present a desirable low profile when traveling to and from the aircraft, as well as functioning as a side guide for placement of the luggage and parcels on the conveyor. The present invention provides a handrail with these desired attributes and which may be quickly and safely repositioned between an erect operative position and a lowered stowed position, which is easy to operate, which presents an inherently neat and clean appearance, which permits a quick and simple adjustment of counter balance force, which is reliable in operation and which requires a minimum of maintenance.

These and other advantages of the present invention, and many of the accompanying advantages thereof, will become more readily apparent upon a perusal of the following description and the accompanying drawings, wherein:

FIG. 1 is a side elevational view of an aircraft belt loader equipped with a collapsible handrail according to the present invention;

FIG. 2 is a pictorial view, with portions broken away, of the left end of the handrail shown in FIG. 1;

FIG. 3 is a side elevational view of a portion of the handrail shown in FIG. 2;

FIG. 4 is a pictorial view, with portions broken away, of an intermediate portion of the handrail shown in FIG. 1, and FIG. 5 is a schematic illustration of the left end of the handrail shown in FIG. 1.

Referring to FIG. 1, there is shown an aircraft belt loader, indicated generally at 10, having a conventional belt conveyor carried on a conveyor frame 12 which is pivotally supported by support arms 14 and 16 from the mobile frame 18 of the loader 10. Hydraulic rams, one of which is shown at 20, are connected between the mobile frame 18 and each of the links 14 and 16. Extension and retraction of these rams causes the attached link and the associated end of the conveyor frame 12 to be respectively raised and lowered. A rail member 22 is supported from the side wall of conveyor frame 12 by a pair of fixed length support arms 24 and 26. These support arms, which are pivotally attached at their upper ends to the rail member 22 and at their lower ends to the frame 12, are essentially parallel and form, with the rail member 22 and the frame 12, a four-bar linkage which maintains the rail member 12 at a substantially constant distance above the frame 12 for any given angular orientation of the arms 26. Stated differently, the four-bar linkage maintains the rail member 12 essentially parallel to the frame 12. A pair of collapsible links 28 and 30 are each pivotally connected to the rail member 22 and the frame 12. These links 28 and 30 are oriented to be essentially parallel to each other but are not parallel to the arms 24 and 26. Preferably, the support arms 24 and 26 are oriented a few degrees from perpendicular to the frame 12 in the direction of rotation, while the links 28 and 30 are oriented a few degrees on the other side of the perpendicular. As best seen in FIG. 5, the rotation of the arms and links to move the rail member 22 from its erect position, as shown by solid lines, to a position adjacent the frame 12 results in a greater component of horizontal movement of the upper end of each the links, 28 and 30 than there is for the arms 24 and 26. Since the rail member 22 is rigid, the distance F between the attachment points of the arm 24 and the link 28 to the rail member 22 remains constant regardless of the angular orientation of the arms and links. The difference between the arc A traced by a pure rotation of the upper end of link 28 about its attachment to the frame 12 and the position of its point of attachment to the rigid rail member 12 is the compression or fore-shortening C of the link 28.

The link 28 has a rod member 32 which has an enlarged end or piston 34 reciprocably retained within a cylindrical tube 36. The rod member 32 has a bearing member 38 attached at its lower end. A pin, the end of which is shown at 40, extends through member 38 and a U-shaped bracket 42 attached to the side wall of the frame 12. A threaded plug 44 is secured in the upper end of the tube 36. A tubular sleeve 46 is positioned between the threaded plug 44 and a spring seat 48. A compression spring 50 is trapped within the tube 36 between the spring seat 48 and the piston 34. A threaded rod 52 is rotatably pinned by pin 54 to a clevis 56 secured to the rail member 22 and threadably engages the threaded plug 44. A lock nut 58 is also threaded onto the rod 52 and is capable of engaging the top of threaded plug 44. When the rail member 22 is moved from its erect position to a lowered position adjacent the frame 12, the fore-shortening C is accommodated by the rod 32 being inserted further onto the tube 36 causing the compression spring 50 to be compressed. The force exerted by the spring 50 can be adjusted, and/or manufacturing variations compensated for, by turning the tube 36 about its longitudinal axis which raises or lowers the tube 36 relative to the rod 32. The lock nut 58 can then be jammed against the plug 44 to lock or set the adjustment. When the rail member 22 is adjacent the frame 12, the force exerted by the compression spring 50 will urge the rail member 22 toward its erect position.

One of the support arms, preferably the rear support arm 24, is provided with a position control and latch means. As shown in FIGS. 2 and 3, the upper end of the arm 24 is rotatably connected to a clevis 60 secured to the rail member 22 by pin 62. The lower end of the arm 24 is rotatably connected to the frame 12 by a pin, not shown, extending through a U-shaped bracket 64 attached to the frame 12 and a bushing member 66 secured to the lower end of the arm 24. A latch pin 68 extends through a complementary hole in the bracket 70 and a guide tube 72, both of which are secured to the arm 24; the tube 72 being secured by a pair of plates 73. A larger diameter head 74 is provided on the upper end of latch pin 68 with a cross rod 76 secured transverse thereto to form a handle. A compression spring 78 is trapped between the bracket 70 and a washer 80 held against axial movement downward of the latch pin by any suitable means, such as a snap ring or roll pin. A cylindrical member 82 is secured to the U-shaped bracket 64 and provided with a plurality of recesses or holes 84 positioned for engagement with the latch pin 68 and angularly spaced to latch the rail member in either the erect position or in the lowered position. Additional recesses or holes may be provided for positioning the rail member at intermediate positions, if desired. While the member 82 is illustrated as a full cylinder in order to simplify its attachment to the bracket 64, a cylindrical or arcuate segment sufficient to accommodate the range of movement of the arm 24 as the rail member 22 is moved between erect and stowed positions is all that is necessary.

To operate the latch means with the rail member in its lowered position, the latch pin 68 is moved axially by the handle 76. This extracts the end of pin from the hole 84 and compresses the spring 78. With the latch pin 68 freed from the hole, a force is exerted on the rail member 22 by the compressed spring 50 within the tube 36 causing the rail member to be urged toward its erect position. Releasing the handle 76 will permit latch pin 68 to be urged into the hole in the member 82 when the rail member reaches its erect position. A stop 68 is secured to a plate 88 attached below the bracket 64 and to the frame 12 and engages the plate 73 when the rail member 22 has reached its erect position. The stop 86 prevents the pin 68 from being forced past the hole in the member 82 intended for latching the rail member 22 in its erect position. Lowering the rail member 22 from its erect position is accomplished in a similar manner. The latch pin 68 is extracted from the hole in arcuate member 82 and a force is applied to rotate the arm 24 in a counter-clockwise direction, as viewed in FIG. 1, until the latch pin 68 is urged into the hole in member 82 intended to retain the rail member in a lowered position.

While a preferred embodiment of the present invention has been illustrated and described herein, various changes and modification may be made therein without departing from the spirit of the invention as defined by the scope of the appended claims.

What is claimed is:

1. A handrail for an aircraft belt loader having a conveyor mounted on a frame, comprising:
    a rigid rail member;
    first and second support arms, each of which is pivotally attached at one end to said rail member and at the other end to said frame, said arms being substantially parallel to each other and the same fixed length as each other;
    said arms, said rail member and said frame defining a four-bar linkage to permit said rail member to be moved between a stowed position adjacent said frame and an operative position elevated from and essentially parallel to said frame;
    a variable-length link pivotally connected to said rail member and having a non-parallel relationship with said arms in said operative position whereby the distance along said rail member between said link and one of said arms is greater than the comparable distance along said frame;
    said link being forced to change its length as said rail member is moved between stowed and operative positions, the maximum change in length being when said rail member is in its stowed position; and
    bias means in said link for exerting a force on said link to urge said rail member toward its operative position, said force increasing with the change in length of said link whereby the force urging said rail member toward its operative position is maximum when said rail member is in its stowed position.

2. The invention according to claim 1, and further comprising releasable latch means associated with one of said arms to hold said rail member in a selected one of said stowed and operative positions.

3. The invention according to claim 2, wherein said latch means comprises:
    an arcuate member having recesses attached to one of said frame and said one arm;
    a pin reciprocally carried by the other of said frame and said one arm and engageable with said recesses; and
    spring means for urging said pin toward said arcuate member.

4. The invention according to claim 1, wherein said link comprises:
    a cylinder member;
    a rod member reciprocably retained within said cylinder member; and
    said bias means comprises a compression spring trapped within said cylinder member.

5. The invention according to claim 4, and further comprising:
    an arcuate member having a pair of recesses therein attached to said frame;
    a pin reciprocably mounted on one of said arms and capable of engaging said recesses; and
    spring means for urging said pin toward said arcuate member.

6. The invention according to claim 5, and further comprising:
    a stop means attached to said frame to prevent said rail member from being rotated beyond its operative position.

* * * * *